United States Patent
Tarao et al.

(10) Patent No.: US 7,683,128 B2
(45) Date of Patent: *Mar. 23, 2010

(54) TELECHELIC IONOMER COMPOSITION FOR GOLF BALL AND GOLF BALL USING THE SAME

(75) Inventors: Toshiyuki Tarao, Kobe (JP); Takashi Sasaki, Kobe (JP); Satoko Okabe, Kobe (JP)

(73) Assignee: SRI Sports Limited, Kobe (JP)

( * ) Notice: Subject to any disclaimer, the term of this patent is extended or adjusted under 35 U.S.C. 154(b) by 433 days.

This patent is subject to a terminal disclaimer.

(21) Appl. No.: 11/651,098

(22) Filed: Jan. 9, 2007

(65) Prior Publication Data

US 2007/0161752 A1    Jul. 12, 2007

(30) Foreign Application Priority Data

Jan. 10, 2006    (JP)    .............................. 2006-002922

(51) Int. Cl.
*C08F 120/04*    (2006.01)
*C08F 8/30*    (2006.01)
*A63B 37/00*    (2006.01)
*A63B 37/12*    (2006.01)

(52) U.S. Cl. .................... 525/123; 525/330.2; 526/219; 526/318.45; 526/318.6; 528/84; 473/373; 473/376; 473/377; 473/385

(58) Field of Classification Search ........................ None
See application file for complete search history.

(56) References Cited

U.S. PATENT DOCUMENTS

| | | | |
|---|---|---|---|
| 3,970,626 A | 7/1976 | Hurst et al. | |
| 4,884,814 A | 12/1989 | Sullivan | |
| 5,565,524 A | 10/1996 | Hamada et al. | |
| 5,869,578 A | 2/1999 | Rajagopalan | |
| 6,121,384 A | 9/2000 | Rajagopalan | |
| 6,930,164 B1* | 8/2005 | Brunelle et al. | ............. 528/271 |
| 2003/0204022 A1* | 10/2003 | Kennedy et al. | ............ 525/242 |
| 2003/0224873 A1 | 12/2003 | Ichikawa et al. | |
| 2005/0004325 A1* | 1/2005 | Wu et al. | ..................... 525/462 |
| 2005/0038190 A1* | 2/2005 | Kuntimaddi | ................. 525/123 |
| 2007/0161750 A1* | 7/2007 | Okabe et al. | ................. 525/192 |
| 2007/0161751 A1* | 7/2007 | Sasaki et al. | ................. 525/192 |
| 2007/0161752 A1 | 7/2007 | Tarao et al. | |

FOREIGN PATENT DOCUMENTS

| | | |
|---|---|---|
| GB | 2 264 302 A | 8/1993 |
| JP | 1-308577 A | 12/1989 |
| JP | 4-61871 | 2/1992 |
| JP | 5-277208 A | 10/1993 |
| JP | 7-132152 A | 5/1995 |
| JP | 8-182777 A | 7/1996 |
| JP | 11-500776 A | 1/1999 |
| JP | 2001-220473 | 8/2001 |
| JP | 2001-515529 A | 9/2001 |
| JP | 2002-530527 | 9/2002 |
| WO | WO 98/36003 A1 | 8/1998 |
| WO | WO-00/29639 | 5/2000 |

OTHER PUBLICATIONS

Notice of Allowance issued Nov. 6, 2009 in related U.S. Appl. No. 11/651,048.
Notification of Reasons for Rejection issued for JP 2006-002921 in related U.S. Appl. No. 11/651,048 and English translation.
Notification of Reasons for Rejection issued for JP 2006-002923 in related U.S. Appl. No. 11/651,036 and English translation.

* cited by examiner

*Primary Examiner*—David Buttner
(74) *Attorney, Agent, or Firm*—Birch, Stewart, Kolasch & Birch, LLP

(57) ABSTRACT

The present invention provides an ionomer composition for a golf ball providing a golf ball which is excellent in abrasion-resistance, durability and resilience, and a golf ball using the same. An ionomer composition for a golf ball of the present invention comprises a binary copolymer obtained by copolymerizing an olefin monomer having 2 to 8 carbon atoms with an unsaturated monomer having an acid functional group and/or a ternary copolymer obtained by copolymerizing an olefin monomer having 2 to 8 carbon atoms, an unsaturated monomer having an acid functional group and an unsaturated carboxylic acid ester, wherein a functional group is introduced in both terminals of the copolymers.

20 Claims, 4 Drawing Sheets

TELECHELIC IONOMER COMPOSITION FOR GOLF BALL AND GOLF BALL USING THE SAME

BACKGROUND OF THE INVENTION

1. Field of the Invention

The present invention relates to a novel telechelic ionomer composition for a golf ball, preferably used for producing a cover and an intermediate layer of the golf ball, and a golf ball using the same.

2. Description of the Related Art

A wound-core golf ball having a balata cover, a two-piece or three-piece golf ball having an ionomer cover, and the like are known as a conventional golf ball. A wound-core golf ball having a balata cover has good shot feeling and controllability, but is expensive due to the complicate production steps, and also has problems such as poor durability and abrasion-resistance. A golf ball having an ionomer cover is excellent in resilience, abrasion-resistance and molding ability due to the relative hardness thereof, but has problems such as poor shot feeling and controllability.

Therefore, the improvements of the shot feeling and the controllability of the ionomer cover have been proposed, for example, in Japanese Unexamined Patent Publication Nos. H01-308577, H05-277208, H07-132152, H08-182777, H11-500776, and 2001-515529. For example, Japanese Unexamined Patent Publication No. H01-308577 discloses a technique of blending a hard ionomer and a soft ionomer. Japanese Unexamined Patent Publication No. H05-277208 discloses a technique of using 2 or more kinds of ionomer resins having a relatively low modulus. Japanese Unexamined Patent Publication No. H07-132152 discloses that a heated mixture of an ionomer resin, a terpolymer consisting of α-olefin, an unsaturated carboxylate and an unsaturated carboxylic acid, and a glycidyl group-containing α-olefin copolymer resin is used as a base resin of the cover. Japanese Unexamined Patent Publication No. H08-182777 discloses that a heated mixture of three kinds comprising an ionomer resin, a maleic anhydride-modified olefin copolymer and a glycidyl group-modified styrene-based block copolymer having JIS-A hardness of from 30-90 is used as a base resin of the cover. Japanese Unexamined Patent Publication No. H11-500776 discloses a production method of a composition for the golf ball cover, comprising saponify a polymer with an inorganic metal base to produce a polymer salt with saponification degree of about 1 to 50%, wherein the polymer comprises a first monomer component containing an olefin monomer having 2 to 8 carbon atoms, a second monomer component containing an acrylate ester having 4 to 22 carbon atoms based on an unsaturated carboxylic acid, and an optional third monomer component containing at least one monomer selected from the group consisting of carbon monoxide, sulfur dioxide, an unsaturated monocarboxylic acid, an olefin having 2 to 8 carbon atoms and a vinyl ester or a vinyl ether of an alkyl acid having 4 to 21 carbon atoms. Japanese Unexamined Patent Publication No. 2001-515529 discloses an acid copolymer such as ethylene-methacrylic acid or a composition including an ionomer and an adipic acid component.

SUMMARY OF THE INVENTION

According to the improving techniques described above, although the shot feeling of the ionomer covers is somewhat improved, the abrasion-resistance and the resilience tend to be lowered. Thus, there is a desire for achieving a golf ball having a higher level of the resilience, the abrasion-resistance and the shot feeling which are well balanced.

The present invention has been achieved in view of the above problems and provides a telechelic ionomer composition for a golf ball comprising, a binary copolymer obtained by copolymerizing an olefin monomer having 2 to 8 carbon atoms and an unsaturated monomer having an acid functional group, and/or a ternary copolymer obtained by copolymerizing an olefin monomer having 2 to 8 carbon atoms, an unsaturated monomer having an acid functional group and an unsaturated carboxylic acid ester, wherein functional groups are introduced into both terminals of the copolymer (the binary copolymer and/or the ternary copolymer).

Namely, a gist of the present invention resides in the use of the telechelic ionomer having functional groups introduced in both the terminals thereof as an ionomer used for a composition for the golf ball. The functional groups at terminals act between molecules or in a molecule, resulting in improving resilient performance and abrasion-resistance while being soft.

According to the present invention, a golf ball well balanced in resilience, abrasion-resistance and good shot feeling can be obtained.

Figure 1:
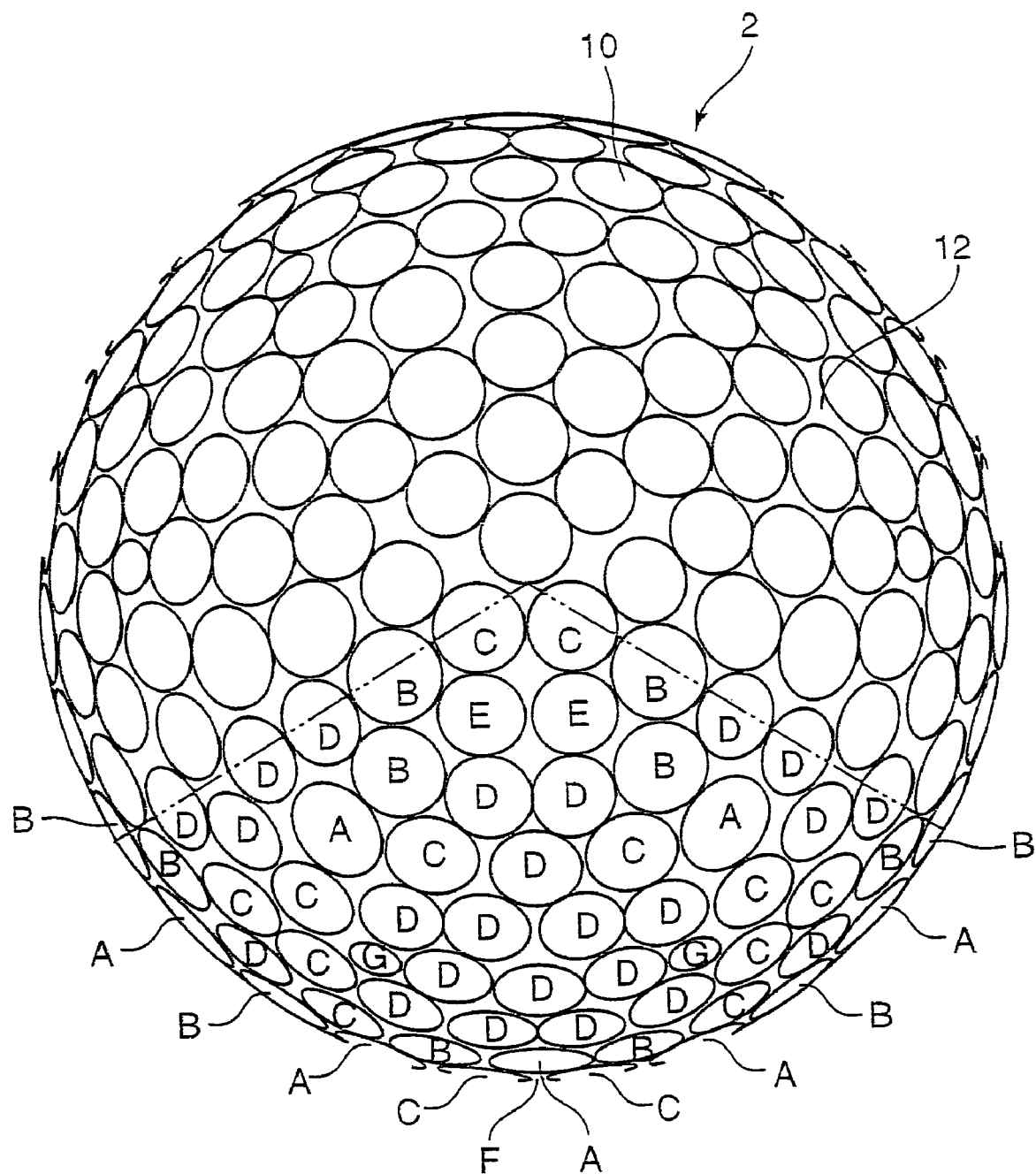
FIG. 1 is a plan view illustrating a dimple pattern formed on a surface of a golf ball.

DESCRIPTION OF THE PREFERRED EMBODIMENTS (1) A Telechelic Ionomer Composition for the Golf Ball of the Present Invention The telechelic ionomer composition for a golf ball comprises a binary copolymer obtained by copolymerizing an olefin monomer having 2 to 8 carbon atoms and an unsaturated monomer having an acid functional group, and/or a ternary copolymer obtained by copolymerizing an olefin monomer having 2 to 8 carbon atoms, an unsaturated monomer having an acid functional group and an unsaturated carboxylic acid ester, wherein functional groups are introduced into both terminals of the binary copolymer and/or the ternary copolymer.

First, the binary copolymer obtained by copolymerizing an olefin monomer having 2 to 8 carbon atoms and an unsaturated monomer having an acid functional group, and/or the ternary copolymer obtained by copolymerizing an olefin monomer having 2 to 8 carbon atoms, an unsaturated carboxylic acid having 2 to 18 carbon atoms and an unsaturated carboxylic acid ester will be explained.

The above olefin monomer having 2 to 8 carbon atoms is an aliphatic unsaturated hydrocarbon having one double bond in a molecule, including for example, ethylene, propylene, butene, pentene, hexene, heptene and octene. Among them, ethylene and propylene are preferable, and ethylene is more preferable. The olefin monomers can be used alone or as a mixture of two or more thereof.

The unsaturated monomer having the acid functional group is not limited as long as it has the acid functional group and an unsaturated double bond which can be copolymerized with the olefin monomer. Examples include an unsaturated carboxylic acid, an unsaturated sulfonate and an unsaturated phosphonic acid.

The above unsaturated carboxylic acid is one having 2 to 18 carbon atoms and containing at least one or more ethylenically unsaturated double bond in a molecule and a carboxylic group, more preferably an $\alpha,\beta$-unsaturated carboxylic acid having 3 to 8 carbon atoms. Examples of the unsaturated carboxylic acid having 2 to 18 carbon atoms include acrylic acid, methacrylic acid, fumaric acid, maleic acid, crotonic acid (trans-2-butenoic acid), isocrotonic acid (cis-2-butenoic acid), sorbic acid, citraconic acid and mesaconic acid; in particular, acrylic acid and methacrylic acid are preferable.

Examples of the unsaturated sulfonate include a styrene sulfonate, and examples of the unsaturated phosphonic acid include 2-methacryloyloxy ethyl phosphate (LIGHT-ESTER P-1M available from KYOEISHA CHEMICAL Co., LTD). The unsaturated monomer having the acid functional group forms an ion center in the copolymer by the acid functional group thereof being neutralized in the copolymer.

Examples of the above unsaturated carboxylic acid ester include a methyl, an ethyl, a propyl, a n-butyl or an isobutyl ester of acrylic acid, methacrylic acid, fumaric acid, maleic acid, crotonic acid (trans-2-butenoic acid), isocrotonic acid (cis-2-butenoic acid), sorbic acid, citraconic acid and mesaconic acid; in particular, the ester of the acrylic acid or a methacrylic acid is preferable.

As the above binary copolymer, particularly preferred is a binary copolymer obtained by copolymerizing ethylene and (meth)acrylic acid, and as the ternary copolymer, particularly preferred is a ternary copolymer obtained by copolymerizing ethylene, (meth)acrylic acid and (meth)acrylic acid ester.

The content of the olefin monomer in the above binary copolymer is 1% by mass or more, more preferably 5% by mass or more, further preferably 10% by mass or more, further more preferably 50% by mass or more, and 99% by mass or less, preferably 95% by mass or less, further preferably 80% by mass or less. When the content of the olefin monomer is outside of the above range, the resilience of the resultant ionomer composition may become insufficient.

The content of the olefin monomer in the above ternary copolymer is 1% by mass or more, more preferably 5% by mass or more, further preferably 10% by mass or more, and 99% by mass or less, preferably 95% by mass or less, further preferably 80% by mass or less. When the content of the olefin monomer is outside of the above range, the resilience of the resultant ionomer composition may become insufficient.

The ternary copolymer preferably contains the unsaturated monomer having the acid functional group in an amount of 1 mass % or more, more preferably 5 mass % or more, even more preferably 8 mass % or more, and preferably contains the unsaturated monomer having the acid functional group in an amount of 50 mass % or less, more preferably 40 mass % or less, even more preferably 30 mass % or less. If the content of the unsaturated monomer having the acid functional group is outside the above range, the impact resilience of the obtained ionomer composition may become insufficient.

In the telechelic ionomer composition for the golf ball of the present invention, the functional groups are introduced in both terminals of the binary copolymer or the ternary copolymer. Herein, the functional groups introduced in both terminals are not derived from the unsaturated monomer having the acid functional group, but are ones introduced into both terminals of copolymer by an another method that will be described later. The functional groups introduced in both terminals may be of the similar kind to the acid functional group.

Examples of the functional groups introduced in terminals include a carboxyl group, a hydroxyl group, an amino group, an isocyanate group, halogen, a nitro group, a thiol group and an epoxy group. Preferable is a hydroxyl group, an amino group or an isocyanate group. Also, functional groups in both terminals of the binary copolymer and ternary copolymer may be different or the same, but preferably is the same.

Methods of introducing a functional group into both terminals of the binary or ternary copolymer include, for example, a use of an initiator or a chain transfer agent having a functional group. Examples of an initiator capable of introducing a hydroxyl group include hydrogen peroxide, 2,2'-azobis{2-[1-(2-hydroxyethyl)-2-imidazoline-2-yl]propane} dihydrochloride (VA-60 available from Wako Pure Chemical Industries, Ltd.), 2,2'-azobis[2-methyl-N-(2-hydroxyethyl) propionamide] (VA-086 available from Wako Pure Chemical Industries, Ltd.), and 2,2'-azobis{2-methyl-N-[1,1-bis (hydroxymethyl)-2-hydroxyethyl]propionamide} (VA-080 available from Wako Pure Chemical Industries, Ltd.); examples of an initiator capable of introducing a carboxyl group include 2,2'-azobis[N-(2-carboxyethyl)-2-methylpropionamidine] hydrate (VA-057 available from Wako Pure Chemical Industries, Ltd.); examples of an initiator capable of introducing an amino group include 2,2'-azobis(2-methylpropionamidine) dihydrochloride (V-50 available from Wako Pure Chemical Industries, Ltd.). Also, using an initiator capable of introducing an allyl group, 2,2'-azobis[N-(2-propenyl)-2-methylpropionamide] (VF-096 available from Wako Pure Chemical Industries, Ltd.), it may be modified into a desired functional group such as an epoxy group by introducing an allyl group followed by conducting an addition reaction or an oxidation reaction. Further, an alkoxyamine type initiator having various functional groups can be listed.

As a chain transfer agent capable of introducing a functional group include, examples of the chain transfer agent capable of introducing halogen, include carbon tetrachloride and carbon tetrabromide. Preferably, once halogen is introduced, then halogen is replaced with a nitro group, a thiol group, an amino group, a hydroxyl group or the like. Examples of a chain transfer agent capable of introducing a hydroxyl group include mercaptoethanol. Also, a functional group X can be introduced in the terminals by using an addition splitting type chain transfer agent having a structure of $CH_2=C(CH_2X)Y$, where X=Br or $SO_2Ar$. When the same functional group is introduced at both terminals of the binary copolymer and/or the ternary copolymer, it is preferable to adopt one capable of introducing the same functional group as the initiator and the chain transfer agent.

Also, a method of introducing an isocyanate group at the terminals may include, for example, a method wherein a hydroxyl group or an amino group is once introduced at the terminals of the copolymer followed by being reacted with a polyisocyanate, or a method wherein an amino group is once introduced followed by being reacted with phosgene to be modified into an isocyanate group.

The polyisocyanate may include, for example, an aromatic polyisocyanate such as 2,4-toluene diisocyanate, 2,6-toluene diisocyanate, a mixture of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), paraphenylene diisocyanate (PPDI); and an alicyclic polyisocyanate or an aliphatic polyisocyanate such as 4,4'-dicyclohexylmethane diisocyanate ($H_{12}MDI$), hydrogenated xylene diisocyanate ($H_6XDI$), hexamethylene diisocyanate (HDI), isophorone diisocyanate (IPDI) and norbornene diisocyanate (NBDI). The above polyisocyanate may be used alone or as a mixture of two or more thereof.

As described above, the telechelic ionomer composition for the golf ball of the present invention can be prepared by introducing a functional group into both terminals of the binary and ternary copolymer. Also, the functional groups in the terminals can be identified by using NMR and IR, for example, as well as by quantitative analysis of the functional group and determining the average molecular weight. For example, methods of quantitative analysis of an isocyanate group include a dibutylamine back-titration method.

In the telechelic ionomer composition of the present invention, at least 10 mole % of the acid functional group is preferably neutralized with an inorganic metal compound. With respect to the degree of the neutralization, the acid functional group is neutralized to the extent of preferably 10 mole % or more, more preferably 20 mole % or more, even more preferably 30 mole % or more. If the degree of the neutralization of the acid functional group is less than 10 mole %, the effects of ionomerization is lowered, thus the abrasion-resistance and the resilience become insufficient. On the other hand, the degree of the neutralization of the acid functional group is preferably 95 mole % or less, more preferably 90 mole % or less, even more preferably 80 mole % or less since the effects of the ionomerization become saturated. Herein, the degree of the neutralization of the acid functional group is defined as the ratio of the number of moles of the neutralized acid functional group with respect to the total number of moles of the acid functional groups contained in the copolymer.

The degree of the neutralization is calculated from the amount of the materials fed. It can also be calculated, for example, by the following formula, using the mole number of a unneutralized carboxyl group ([COOH]) of the unsaturated carboxylic acid in the telechelic ionomer composition determined by thermally fusing the telechelic ionomer composition into tetrahydrofuran and titrating with potassium hydroxide having a normal concentration, and the mole number of the neutralized carboxyl group ([COOM]) calculated by metal analysis.

Degree of the neutralization (mole %)=[COOM]/([COOH]+[COOM])×100

A metal analysis, for example, a monovalent metal such as sodium may be carried out using, for example, 180-80 Type Polarized Zeeman Atomic Absorption Spectrophotometer manufactured by Hitachi, Ltd., and an analysis of a bivalent metal such as zinc may be carried out using, for example, Sequential Type ICP Optical Emission Spectrometer SPS 1100 manufactured by Seiko Instruments Inc.

The above metal (ion) for neutralizing the acid functional group may be any one of metals selected from the group consisting of the 1st group to the 17th group, lanthanoids and actinoids of the periodic table.

The preferable metal can include an alkali metal such as sodium, potassium and lithium; a divalent metal such as magnesium, calcium, zinc, barium and cadmium; a trivalent metal such as aluminum and neodymium; and other metals like tin and zirconium, more preferable are sodium, lithium, zinc and magnesium. The metals can be used alone, or in a combination of two or more thereof.

The slab hardness of the telechelic ionomer composition is preferably 20 or more, more preferably 30 or more, even more preferably 40 or more, and preferably 70 or less, more preferably 65 or less, even more preferably 60 or less in shore D hardness. If the ionomer composition has the slab hardness of less than 20, the telechelic ionomer composition may be too soft for the cover, and resulting in the lowered abrasion-resistance and resilience. On the other hand, if the telechelic ionomer composition has the slab hardness of more than 70 in shore D hardness, the telechelic ionomer composition is too hard, and may result in the crack of the cover, due to the impact of hitting the golf ball with the club.

As the production method of the telechelic ionomer composition used in the present invention, a well known method can be employed. For example, the telechelic ionomer composition can be synthesized using a radical initiator as a polymerization catalyst under the conditions of reaction pressure of about 100 to 300 KPa and reaction temperature from 150° C. to 350° C. in a tank reactor equipped with a stirring machine in the same manner as in the production of a high pressure polyethylene. When an initiator or a chain transfer agent capable of introducing a functional group is used, a functional group can be introduced in both terminals of the copolymer obtained. The neutralization of the acid functional group of the resultant binary copolymer or ternary copolymer can be conducted, for example, by melting the copolymer, adding a given amount of the inorganic metal compound to the melt, and kneading. Specifically, it can be conducted by melt-mixing the copolymer with the inorganic metal compound at a temperature of 150 to 300° C. using an extruder.

(2) Golf Ball of the Present Invention

The golf ball of the present invention has no limitation on the structure, as long as it comprises a core layer and a cover layer covering the core layer. Specific examples of the golf ball of the present invention are as follows.

(A) A two-piece golf ball comprising a core and a cover covering said core, wherein the telechelic ionomer composition for the golf ball is used as a resin component constituting said cover.

(B) A three-piece golf ball comprising a core, an intermediate layer covering said core, and a cover covering said intermediate layer, wherein the telechelic ionomer composition for the golf ball is used as a resin component constituting at least one of the intermediate layer or the cover, more preferably the telechelic ionomer composition for the golf ball is used as a resin component constituting the cover of an outermost layer.

(C) A multi-piece golf ball having at least four layers, wherein the telechelic ionomer composition is used as a resin component constituting at least one layer except for the core; more preferably, the telechelic ionomer composition is used as the resin component constituting the cover of an outermost layer.

(D) A wound-core golf ball comprising a wound core and a cover covering said wound core, wherein the telechelic ionomer composition is used as a resin component constituting said cover.

The telechelic ionomer composition of the present invention will be explained below in an embodiment where the telechelic ionomer composition is used as a resin component constituting a cover or an intermediate layer, but the present invention is not to be limited to the embodiment. In the case where the cover or the intermediate layer is formed using the telechelic ionomer composition for the golf ball of the present invention, as the composition for forming the cover or the intermediate layer (hereinafter, referred to simply as "cover (intermediate layer) composition" in some instances), the composition containing the above telechelic ionomer composition as a resin component may be suitably used. The content of the telechelic ionomer composition in the resin component of said cover (intermediate layer) composition is preferably 50 parts by mass or more, more preferably 60 parts by mass or more and even more preferably 70 parts by mass or more based on the 100 parts by mass of the resin component. Also, as the resin component of the cover (intermediate layer) composition, using the telechelic ionomer composition alone is also a preferable embodiment.

Furthermore, as the resin component of the cover (intermediate layer) composition, other resin component can be used together with the ionomer composition, unless the effect of the present invention is not deteriorated. Examples of the other resin component, in addition to the conventionally known ionomers, include a thermoplastic polyamide elastomer commercially available under a trade name "PEBAX (e.g. PEBAX 2533)" from Arkema Inc., a thermoplastic polyester elastomer commercially available under a trade name "HYTREL (e.g. HYTREL 3548, HYTREL 4047)" from Du Pont-Toray Co. Ltd, a thermoplastic polyurethane elastomer commercially available under a trade name "ERASTOLLAN (e.g. ERASTOLLAN XNY97A)" from BASF Japan Co., and a thermoplastic polystyrene elastomer commercially available under a trade name "RABALON" from Mitsubishi Chemical Corporation. Examples of the isomer resin include, in particular, an ionomer resin wherein at least a part of carboxyl groups in a copolymer of ethylene with $\alpha,\beta$-saturated carboxylic acid having 3 to 8 carbon atoms is neutralized with a metal ion; a part of carboxyl groups in a ternary copolymer formed by copolymerizing ethylene, $\alpha,\beta$-unsaturated carboxylic acid having 3 to 8 carbon atoms and $\alpha,\beta$-unsaturated carboxylate is neutralized with a metal ion, or a mixture thereof.

Specific examples of the ionomer resin as exemplified in a trade name include, Himilan 1555(Na), Himilan 1557 (Zn), Himilan 1605 (Na), Himilan 1706(Zn), Himilan 1707(Na) and Himilan AM7311 (Mg) commercially available from Du Pont-Mitsui Polychemicals Co. Ltd.; and Himilan 1856 (Na) and Himilan 1855(Zn) as a ternary copolymer ionomer resin.

Further, examples of an ionomer resin commercially available from Du Pont Corp. include Surlyn 8945 (Na), Surlyn 9945 (Zn), Syrlyn 8140 (Na), Surylyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li) and Surlyn AD8546 (Li), and examples of a ternary copolymer isomer resin include Surlyn 8120 (Na), Surlyn 8320 (Na), Surlyn 9320 (Zn) and Surlyn 6320 (Mg).

Also, examples of an ionomer resin commercially available from ExxonMobil Chemical Co. include Iotek 8000 (Na), Iotek 8030 (Na) Iotek 7010 (Zn) and Iotek 7030 (Zn), and examples of a ternary copolymer ionomer resin include Iotek 7510 (Zn) and Iotek 7520 (Zn).

Additionally, Na, Zn, K, Li and Mg described in parentheses after the trade name of the above ionomer resin indicate the kind of metal of the neutralizing metal ions. The cover (intermediate layer) composition for the golf ball of the present invention may contain, in addition to said telechelic ionomer composition for the golf ball, a pigment component such as titanium oxide and blue pigment, a specific gravity adjusting agent such as a calcium carbonate and a barium sulfate, a dispersing agent, an antioxidant, an ultraviolet absorbent, a light stabilizer, a fluorescent material or a fluorescent brightener, to the extent that the desired performance is not damaged.

Also, the thickness of the cover and the intermediate layer using the telechelic ionomer composition for the golf ball of the present invention is preferably 0.1 mm or more, more preferably 0.3 mm or more, even preferably 0.5 mm or more, and preferably 2.0 mm or less, more preferably 1.5 mm or less and even more preferably 1.2 mm or less. In the case that the thickness is less than 0.1 mm, it may be difficult to mold the cover and the intermediate layer in some instances. In the case that the thickness is more than 2.0 mm, the cover and the intermediate layer become too thick, and thus the resilience of the resultant golf ball may decrease in some instances.

As the method for forming the cover or the intermediate layer, for example, the cover or the intermediate layer is molded by covering a core with the cover (intermediate layer) composition. The method for molding the cover or the intermediate layer is not particularly limited, and includes, for example, a method including previously molding the cover (intermediate layer) composition into hemispherical half shells, covering the core with two half shells, and subjecting the core with the two half shells to the pressure molding at the temperature of 130 to 170° C. for 1 to 5 minutes, or a method including injection molding the cover (intermediate layer) composition directly onto the core directly to cover the core.

Also, in preparing the golf ball body by molding the cover, a concavity called dimple is generally formed on the surface. After the formation of a cover, paint finish, stamp and the like may be carried out as required. Further, if necessary, the surface of the golf ball body may be subjected to a grinding treatment like sand blast treatment to enhance the adhesion to a mark or paint film.

The golf ball of the present invention is not particularly limited as long as the telechelic ionomer composition is used for at least one layer of the intermediate layer or the cover layer. The conventionally known resin compositions described above may be used for the layer which does not contain said telechelic ionomer composition.

As the core of the golf ball of the present invention, preferred is a molded body (a rubber core) which is formed by heat-pressing a rubber composition. The rubber composition preferably comprises a base rubber, a co-crosslinking agent, a crosslinking initiator and a filler. As the above base rubber, a natural rubber and/or a synthetic rubber, for example, a polybutadiene rubber, a natural rubber, a polyisoprene rubber, a styrene-polybutadiene rubber and an ethylene-propylene-diene rubber (EPDM) may be used. Among them, a butadiene rubber, particularly a high cis-polybutadiene, having a cis bond of 40% or more, more preferably 70% or more, even more preferably 90% or more is preferable in view of its superior repulsion property.

As the above crosslinking initiator, an organic peroxide may be preferably used. Examples of the organic peroxide include dicumyl peroxide, 1,1-bis (t-butylperoxy)-3,5-trimethylcyclohexane, 2,5-dimethy-2,5-di (t-butylperoxy)hexane and di-t-butyl peroxide. Among them, dicumyl peroxide is preferably used. The amount of the organic peroxide to be blended is preferably 0.3 parts by mass or more, more preferably 0.4 parts by mass or more, and preferably 5 parts by mass or less, more preferably 3 parts by mass or less relative to 100 parts by mass of the base rubber. If the amount is less than 0.3 parts by mass, the core becomes too soft, which tends to decrease resilience, while if the amount is more than 5 parts by mass, it becomes too hard, which lowers the shot feeling.

As the above co-crosslinking agent, $\alpha,\beta$-unsaturated carboxylic acid having 3 to 8 carbon atoms or the metal salt thereof may be used. Examples of the metal constituting the metal salt include zinc, magnesium, calcium, aluminum and sodium, and zinc is preferably used pointing view of increasing resilience. Examples of the preferable $\alpha,\beta$-unsaturated carboxylic acid and the metal salt are acrylic acid, methacrylic acid, zinc acrylate and zinc methacrylate.

The amount of the co-crosslinking agent used is 10 parts by mass or more, more preferably 15 parts by mass or more, even more preferably 20 parts by mass or more, and 55 parts by mass or less, more preferably 50 parts by mass or less and even more preferably 48 parts by mass or less relative to 100 parts by mass of the base rubber. When the amount of the co-crosslinking agent used is less than 10 parts by mass, the amount of the organic peroxide used must be increased to provide a suitable hardness, which tends to decrease the resilience. On the other hand, when the amount of the co-crosslinking agent used is more than 55 parts by mass, a core becomes too hard, which may lower the shot feeling.

The above filler may be one conventionally formulated in the core of the golf ball. The filler may include an inorganic salt, specifically, such as a zinc oxide, a barium sulfate and a calcium carbonate, and a high specific gravity metal powder such as a tungsten powder, a molybdenum powder and the mixture thereof. The amount of the filler to be blended is 0.5 parts by mass or more, preferably 1 part by mass or more, and 30 parts by mass or less, preferably 20 parts by mass or less relative to the base rubber of 100 parts by mass. If the amount is less than 0.5 parts by mass, the adjustment of the specific gravity becomes too difficult to obtain an appropriate weight, while if the amount is more than 30 parts by mass, the resilience is lowered because of a small rubber portion occupied in the entire core.

The above rubber composition for the core, may further contain an organic sulfur compound, an antioxidant, or a peptizing agent, in addition to the base rubber, the co-crosslinking agent, the organic peroxide, and the filler.

Examples of the organic sulfur compound are diphenyl disulfide; mono-substituted diphenyl disulfide such as bis(4-chlorophenyl) disulfide, bis(3-chlorophenyl) disulfide, bis(4-bromophenyl) disulfide, bis(3-bromophenyl) disulfide, bis(4-fluorophenyl) disulfide, bis(4-iodophenyl) disulfide, and bis(4-cyanophenyl) disulfide; di-substituted diphenyl disulfide such as bis(2,5-dichlorophenyl) disulfide, bis(3,5-dichlorophenyl) disulfide, bis(2,6-dichlorophenyl) disulfide, bis(2,5-dibromophenyl) disulfide, bis(3,5-dibromophenyl) disulfide, bis(2-chloro-5-bromophenyl) disulfide, and bis(2-cyano-5-bromophenyl) disulfide; tri-substituted diphenyl disulfides such as bis(2,4,6-trichlorophenyl) disulfide and bis(2-cyano-4-chloro-6-bromophenyl) disulfide; tetra-substituted diphenyl disulfide such as bis(2,3,5,6-tetrachlorophenyl) disulfide; and penta-substituted diphenyl disulfide such as bis(2,3,4,5,6-pentachlorophenyl) disulfide and bis(2,3,4,5,6-pentabromophenyl) disulfide. These diphenyl disulfide derivatives have some sort of effect on the crosslinking state of the vulcanized rubber and thus enhance the resilience. Among them, diphenyl disulfide and bis(pentabromophenyl) disulfide are particularly preferable, because the golf ball having the very high resilience is obtained.

The amount of the antioxidant added is preferably 0.1 parts by mass or more, and 1 part by mass or less relative to 100 parts by mass of the base rubber. Also, the amount of the peptizing agent is preferably 0.1 parts by mass or more, and 5 parts by mass or less relative to the base rubber of 100 parts by mass.

The core is formed by kneading the above rubber composition and press-molding it into the spherical body in the mold. The conditions for the press-molding should be determined depending on the rubber composition. The press-molding is preferably carried out for 10 to 40 minutes at the temperature of 130 to 180° C. under the pressure of 2.9 MPa to 11.8 MPa.

The core preferably has a diameter of 30 mm or more, more preferably 32 mm or more, and preferably has a diameter of 41 mm or less, more preferably 40.5 mm or less. If the diameter of the core is less than 30 mm, the thickness of the intermediate layer and the cover becomes thicker than the desired thickness and thus the resilience may be lowered. On the other hand, if the diameter of the core is larger than 41 mm, the thickness of the intermediate layer and the cover becomes thinner than the desired thickness and thus the intermediate layer or the cover may not function well.

In the case that the core has a diameter of 30 mm to 41 mm, the core preferably has a compression deformation amount (an amount shrinks along the direction of the compression) of 2.5 mm or more, more preferably 3.0 mm or more and preferably has a compression deformation amount of 5.0 mm or less, more preferably 4.5 mm or less when applying a load from 98 N as an initial load to 1275 N as a final load. If the compression deformation amount is less than 2.5 mm, the shot feeling may become bad due to the hardness, while if the compression deformation amount is larger than 5.0 mm, the resilience may become low.

The golf ball of the present invention, when it has a diameter of 42.60 mm to 42.90 mm and when applying a load from an initial load of 98N to a final load of 1275N, has an amount of compression deformation (amount of golf ball compressed in the direction of compression) of 2.0 mm or more, more preferably 2.1 mm or more, even more preferably 2.2 mm or more, and 4.5 mm or less, more preferably 4.0 mm or less, further preferably 3.5 mm or less. When the amount of compression deformation is less than 2.0 mm, the shot feeling becomes hard and bad, while when the amount exceeds 4.5 mm, there are some instances that resilience is lowered.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Methods]

(1) Slab Hardness (Shore D Hardness)

The telechelic ionomer composition and the cover (intermediate layer) composition were each formed into sheets each having a thickness of about 2 mm by hot press molding and the resulting sheets were maintained at 23° C. for two weeks. Three or more of the sheets were stacked on one another to avoid being affected by the measuring substrate on which the sheets were placed, and the stack was subjected to the measurement using P1 type auto hardness tester provided with the Shore D type spring hardness tester prescribed by ASTM-D2240, available from KOUBUNSHI KEIKI CO., LTD.

(2) Abrasion-Resistance

A commercially available pitching wedge was attached to a swing robot available from Golf laboratory Co., and two points of a ball respectively were hit once at the head speed of 36 m/sec. to observe the areas which were hit. Abrasion-resistance was evaluated and ranked into three levels based on following criteria.

[Evaluation Criteria]
G(Good): Slight scratches were present on the surface of the golf ball, but almost no care.

F(Fair): Scratches were clearly left on the surface of the golf ball, and a little scuffing could be observed.

P(Poor): The surface of the golf ball was abraded considerably, and scuffing was conspicuous.

(3) Amount of Compression Deformation (mm)

An amount of deformation in the compression direction (amount of golf ball compressed in the direction of compression) was measured in each of golf balls or cores when applying from an initial load of 98N to a final load of 1275N.

(4) Repulsion Coefficient of Golf Ball

Aluminum cylinder having a weight of 200 g was collided with the resultant golf ball at the speed of 45 m/sec. to measure the speed of the cylinder and the golf ball before and after the collision. The repulsion coefficient of each golf ball was obtained based on each of the measured speed and weight. Each golf ball was measured 5 times to obtain the average. The repulsion coefficient measured in terms of each golf ball is reduced to an index number relative to the measured value obtained in Golf ball No. 2 whose repulsion coefficient is assumed 100. The higher value of repulsion index indicates higher resilience.

(5) Shot Feeling

The hitting test using a metal head driver W#1 was conducted by 10 golfers (two professionals, eight advanced amateurs having a handicap of 5 or less). Resilient feel of the impact when hitting the golf ball was evaluated in the following criteria, and the result largest in number was defined as the shot feeling of the golf ball.

G(good): Good resilient feel

F(fair): Average

P(poor): Heavy feel and weak resilient feel

[Synthesis of Telechelic Ionomer Composition]

(1) To a stirring autoclave type continuous reactor of 1.5 liters in internal volume were loaded a monomer mixture of ethylene and methacrylic acid (content of methacrylic acid=12 mass %) and 2,2'-azobis[2-methyl-N-(2-hydroxyethyl)-2-methylpropionamide] (VA-086 manufactured by Wako Pure Chemical Ltd.) as a radical polymerization initiator of 4 ppm by mass relative to said monomer mixture, and a reaction was carried out at 160° C. while keeping a pressure in the reactor at 1600 kg/cm$^2$. The resultant copolymer and unreacted monomer were removed into a separation container through an adjusting valve, followed by separation of the copolymer to give the copolymer having hydroxyl groups introduced in both terminals thereof.

After 4.8 parts by mass of sodium hydroxide was blended to 100 parts by mass of the resultant hydroxyl group terminated ethylene-methacrylic acid copolymer, the mixture was extruded at the temperature of 140° C. by a twin-screw kneading extruder to neutralize the carboxyl group. Then as an polyisocyanate, 0.1 part by mass of 4,4'-diphenylmethane diisocyanate (MDI) was added to conduct a reaction using a twin-screw kneading extruder to obtain the telechelic ionomer 1 consisting of the ethylene-methacrylic acid copolymer having isocyanate groups introduced in both terminals.

(2) Isocyanate group both terminated telechelic ionomer 2 was produced in the same manner as in the telechelic ionomer 1 except that 7.2 parts by mass of zinc hydroxide was used in place of sodium hydroxide.

(3) The isocyanate group both-terminated telechelic ionomer was prepared in the same manner as the telechelic ionomer 1 except that methacrylic acid was blended such that the content of the methacrylic acid became 8 mass % and the amount of sodium hydroxide was changed to 3.2 parts by mass.

(4) The isocyanate group both-terminated telechelic ionomer was prepared in the same manner as in the telechelic ionomer 2 except that methacrylic acid was blended such that the content of the methacrylic acid became 8 mass % and the amount of zinc hydroxide was changed to 4.8 parts by mass.

(5) The isocyanate group both-terminated telechelic ionomer 5 was prepared in the same manner as in the telechelic ionomer 1 except that a monomer mixture of ethylene, methacrylic acid and acrylic acid ester (the content of methacrylic acid=5 mass %) was used and the amount of sodium hydroxide was changed to 2 parts by mass.

(6) The isocyanate group both-terminated telechelic ionomer 6 was prepared in the same manner as the telechelic ionomer 2 except that a monomer mixture of ethylene, methacrylic acid and acrylic acid ester (the content of methacrylic acid=5 mass %) was used and the amount of zinc hydroxide was changed to 3 parts by mass.

(7) To a stirring autoclave type continuous reactor of 1.5 liters in internal volume were loaded a monomer mixture of ethylene and methacrylic acid (content of methacrylic acid=8% by mass) and 2,2'-azobis[2-methyl-N-(2-hydroxyethyl)propionamidine] dihydrochloride (V-50 manufactured by Wako Pure Chemical Ltd.) as a radical polymerization initiator of 4 ppm by mass relative to the monomer mixture, and the reaction was carried out at 160° C. while keeping a pressure in the reactor at 1600 kg/cm$^2$. The resultant copolymer and unreacted monomer were removed into a separation container through an adjusting valve, followed by separation of the copolymer to give a copolymer of which amino groups were introduced in both terminals. After 4.8 parts by mass of sodium hydroxide was blended to 100 parts by mass of the resultant amino groups both-terminated ethylene-methacrylic acid copolymer, followed by extrusion using a twin-screw kneading extruder to obtain the telechelic ionomer 7 consisting of the ethylene-methacrylic acid copolymer having amino groups introduced in both terminals.

(8) The telechelic ionomer 8 was produced in the same manner as in the telechelic ionomer 7 except that 4.8 parts by mass of zinc hydroxide was used in place of sodium hydroxide.

(9) The amino group and carboxyl group terminated telechelic ionomer 9 was prepared in the same manner as the telechelic ionomer 7, except that 2,2'-azo bis(2-methylpropionamidine) dihydrochloride (V-50 manufactured by Wako Pure Chemical Industries, Ltd.) and 2,2'-azo bis[N-(2-carboxyethyl)-2-methyl propionamidine] hydrate (V-057 manufactured by Wako Pure Chemical Industries, Ltd.) were used as the radical polymerization initiator such that each became 2 mass ppm by mass to the monomer mixture.

(10) The amino group and carboxyl group terminated telechelic ionomer 9 was prepared in the same manner as the telechelic ionomer 8, except that 2,2'-azo bis(2-methylpropionamidine) dihydrochloride (V-50 manufactured by Wako Pure Chemical Industries, Ltd.) and 2,2-azo bis[N-(2-carboxyethyl)-2-methyl propionamidine] hydrate (V-057 manufactured by Wako Pure Chemical Industries, Ltd.) were used as the radical polymerization initiator such that each became 2 mass ppm by mass to the monomer mixture.

(11) The carboxyl group both-terminated telechelic ionomer 11 was prepared in the same manner as the telechelic ionomer 7, except that 2,2'-azo bis[N-(2-carboxyethyl)-2-methyl propionamidine] hydrate (V-057 manufactured by Wako Pure Chemical Industries, Ltd.) was used as the radical polymerization initiator.

(12) The carboxyl group both-terminated telechelic ionomer 12 was prepared in the same manner as the telechelic ionomer 8, except that 2,2'-azo bis[N-(2-carboxyethyl)-2- methyl propionamidine] hydrate (V-057 manufactured by Wako Pure Chemical Industries, Ltd.) was used as the radical polymerization initiator.

[Production of Golf Ball]

(1) Production of the Core

The rubber composition shown in Table 1 was kneaded, and pressed in upper and lower molds each having a spherical cavity at the heating condition of 170° C. for 20 minutes to obtain the solid core in a spherical shape.

TABLE 1

| Core composition | A | B |
|---|---|---|
| Polybutadiene rubber | 100 | 100 |
| Zinc acrylate | 29 | 28 |
| Zinc oxide | 5 | 5 |
| Barium sulfate | appropriate amount* | appropriate amount* |
| Pentabromo disulfide | 0.5 | 0.5 |
| Dicumyl peroxide | 0.9 | 0.7 |
| Core diameter (mm) | 40.3 | 37.3 |
| Compression deformation amount of core (mm) | 3.2 | 3.5 |

Formulation: parts
*Adjustment for a golf ball to weigh 45.4 g according to the composition of cover Notes on Table 1

Polybutadiene rubber: BR-18 (high-cis polybutadiene) available from JSR Corporation Zinc acrylate: ZNDA-90S available from Nihon Jyoryu Co. Ltd.

Zinc oxide: Ginrei R available from Toho Zinc Co. Ltd.

Barium sulfate: Barium sulfate BD available from Sakai Chemical Industry Co. Ltd.

Dicumyl peroxide: Percumyl D available from NOF Corporation The amount of barium sulfate was appropriately adjusted to obtain the golf ball having a mass of 45.4 g.

(2) Preparation of the Cover (Intermediate Layer) Composition

The materials shown in Table 2 were mixed using a twin-screw kneading extruder to obtain the cover (intermediate layer) composition in the form of pellet as shown in Table 3. The extrusion was conducted in the following conditions:

screw diameter=45 mm, screw revolutions=200 rpm, screw L/D=35, and the cover (intermediate layer) composition was heated to from 160° C. to 230° C. at the die position of the extruder.

TABLE 2

| Materials | Monomer composition | | | Acid Content (mass %) | Terminated functional group | Neutralizing metal | Degree of neutralization (mol %) | Shore D hardness |
|---|---|---|---|---|---|---|---|---|
| Telechelic Ionomer 1 | Ethylene | Methacrylic acid | — | 12 | Diterminated NCO | Na | 40 | 64 |
| Telechelic Ionomer 2 | Ethylene | Methacrylic acid | — | 12 | Diterminated NCO | Zn | 60 | 64 |
| Telechelic Ionomer 3 | Ethylene | Methacrylic acid | — | 8 | Diterminated NCO | Na | 40 | 59 |
| Telechelic Ionomer 4 | Ethylene | Methacrylic acid | — | 8 | Diterminated NCO | Zn | 60 | 59 |
| Telechelic Ionomer 5 | Ethylene | Methacrylic acid | Acrylic acid ester | 5 | Diterminated NCO | Na | 40 | 53 |
| Telechelic Ionomer 6 | Ethylene | Methacrylic acid | Acrylic acid ester | 5 | Diterminated NCO | Zn | 60 | 53 |
| Telechelic Ionomer 7 | Ethylene | Methacrylic acid | — | 8 | Diterminated NH2 | Na | 40 | 57 |
| Telechelic Ionomer 8 | Ethylene | Methacrylic acid | — | 8 | Diterminated NH2 | Zn | 60 | 57 |
| Telechelic Ionomer 9 | Ethylene | Methacrylic acid | — | 8 | NH2 and COOH | Na | 40 | 58 |
| Telechelic Ionomer 10 | Ethylene | Methacrylic acid | — | 8 | NH2 and COOH | Zn | 60 | 58 |
| Telechelic Ionomer 11 | Ethylene | Methacrylic acid | — | 8 | Diterminated COOOH COOH | Na | 40 | 59 |
| Telechelic Ionomer 12 | Ethylene | Methacrylic acid | — | 8 | Diterminated COOOH COOH | Zn | 60 | 59 |
| Himilan 1605 | Ethylene | Methacrylic acid | — | — | — | Na | — | 65 |
| Himilan 1706 | Ethylene | Methacrylic acid | — | — | — | Zn | — | 64 |
| Himilan 1555 | Ethylene | Methacrylic acid | Acrylic acid ester | — | — | Na | — | 60 |
| Himilan 1557 | Ethylene | Methacrylic acid | Acrylic acid ester | — | — | Zn | — | 59 |
| Himilan 1856 | Ethylene | Methacrylic acid | Acrylic acid ester | — | — | Na | — | 52 |
| Himilan 1855 | Ethylene | Methacrylic acid | Acrylic acid ester | — | — | Zn | — | 54 |

TABLE 3

| Materials | Cover (intermediate layer) composition | | | | | | | | | | | | | |
|---|---|---|---|---|---|---|---|---|---|---|---|---|---|---|
| | A | B | C | D | E | F | G | H | I | J | K | L | M | N |
| Telechelic Ionomer 1 | 50 | — | — | — | — | — | — | — | — | — | — | — | — | — |
| Telechelic Ionomer 2 | 50 | — | — | 50 | — | — | — | — | — | — | 20 | — | — | — |
| Telechelic Ionomer 3 | — | 50 | — | — | — | — | — | — | — | — | — | — | — | — |
| Telechelic Ionomer 4 | — | 50 | — | — | — | — | — | — | — | — | — | — | — | — |
| Telechelic Ionomer 5 | — | — | 50 | — | — | — | — | — | — | — | — | — | — | — |
| Telechelic Ionomer 6 | — | — | 50 | — | 50 | — | — | — | — | — | — | — | 20 | — |
| Telechelic Ionomer 7 | — | — | — | — | — | 50 | — | — | — | — | — | — | — | — |
| Telechelic Ionomer 8 | — | — | — | — | — | 50 | — | — | — | — | — | — | — | — |
| Telechelic Ionomer 9 | — | — | — | — | — | — | 50 | — | — | — | — | — | — | — |
| Telechelic Ionomer 10 | — | — | — | — | — | — | 50 | — | — | — | — | — | — | — |
| Telechelic Ionomer 11 | — | — | — | — | — | — | — | — | — | — | — | — | — | 50 |
| Telechelic Ionomer 12 | — | — | — | — | — | — | — | — | — | — | — | — | — | 50 |
| Himilan 1605 | — | — | — | 50 | 50 | — | — | 50 | — | — | 50 | 80 | 80 | — |
| Himilan 1706 | — | — | — | — | — | — | — | 50 | — | — | — | — | — | — |
| Himilan 1555 | — | — | — | — | — | — | — | — | 50 | — | — | — | — | — |
| Himilan 1557 | — | — | — | — | — | — | — | — | 50 | — | — | — | — | — |
| Himilan 1856 | — | — | — | — | — | — | — | — | — | 50 | — | — | — | — |
| Himilan 1855 | — | — | — | — | — | — | — | — | — | 50 | 50 | — | — | — |
| Titanium oxide | 2 | 2 | 2 | 2 | 2 | 2 | 2 | 2 | 2 | 2 | 2 | 2 | 2 | 2 |
| Slab hardness (Shore D) | 66 | 61 | 55 | 66 | 60 | 61 | 61 | 66 | 61 | 55 | 60 | 67 | 63 | 60 |

Notes on Table 3
Himilan: an ionomer resin manufactured by Du Pont-Mitsui Polychemicals Co. Ltd.

(3) Production of Golf Ball Body

The cover (intermediate layer) composition obtained as described above was injection molded onto the core obtained as described above to form the intermediate layer covering said core and/or the cover. The upper and lower molds for forming the cover have a spherical cavity having dimples. The part of the dimples can serve as a hold pin which is retractable. When forming the golf ball body, the hold pins were protruded to hold the core, and the resin heated at 210° C. was charged into the mold held under the pressure of 80 tons for 0.3 second. After the cooling for 30 seconds, the molds were opened and then the golf ball body was discharged. The surface of the resultant golf ball was subjected to a sand blast treatment, and marking, and then applied with a clear paint thereto, the paint was dried in an oven at 40° C. to give a golf ball having a diameter of 42.7 mm and a mass of 45.4 g. The dimple patterns shown in Table 4 and FIGS. 1 to 3 were formed on the surface of the golf ball. In FIGS. 1 to 4, reference sign 10 represents "dimple", reference sign A "dimple A", reference sign B "dimple B", reference sign C "dimple C", reference sign C "dimple C", reference sign D "dimple D", reference sign E "dimple E", reference sign F "dimple F", reference sign G "dimple G", reference sign 2 "golf ball", reference sign 12 "land", reference sign 14 "phantom sphere", reference sign Ed "edge", respectively.

The evaluation results of the golf balls obtained are shown in Table 5 regarding the composition of golf ball, abrasion-resistance, flight distance, shot feeling and amount of spin.

TABLE 4

Figure 2:
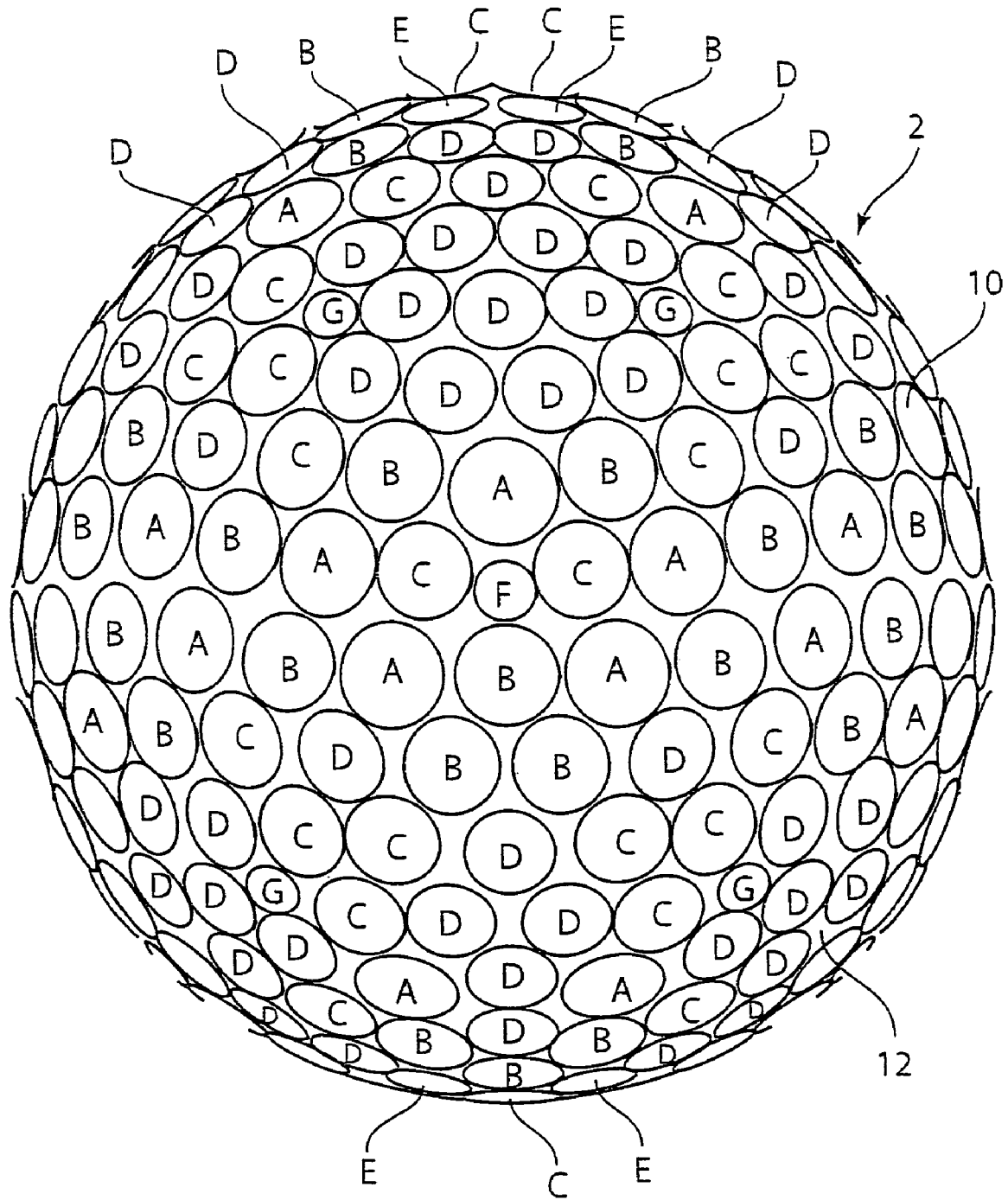
FIG. 2 is a front view illustrating a dimple pattern formed on a surface of a golf ball.
Figure 3:
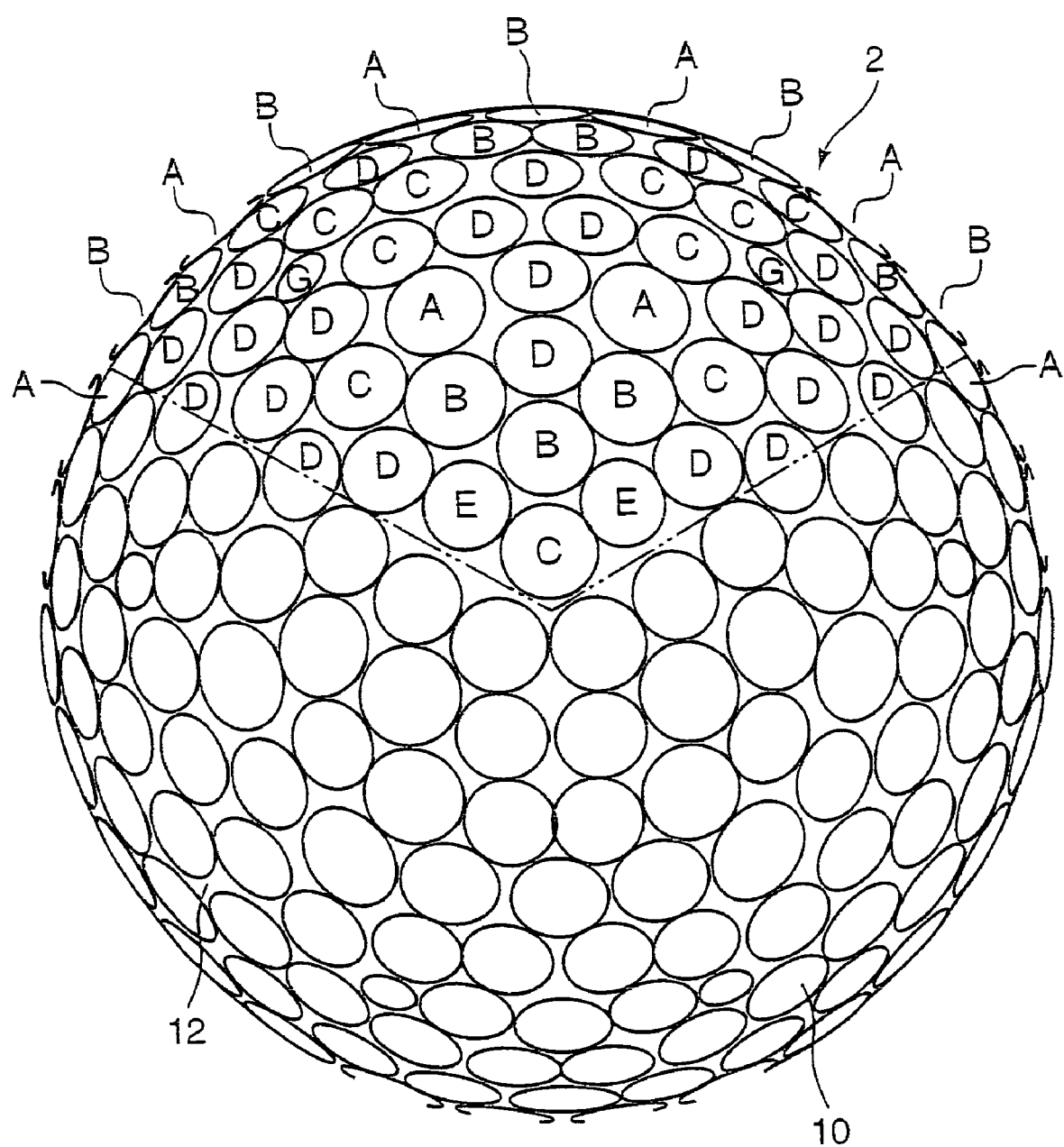
FIG. 3 is a bottom view illustrating a dimple pattern formed on a surface of a golf ball.

| Type | Number | Diameter (mm) | Depth (mm) | Volume (mm³) | Plan view | Front view | Bottom view |
|---|---|---|---|---|---|---|---|
| A | 42 | 4.65 | 0.135 | 1.148 | FIG. 1 | FIG. 2 | FIG. 3 |
| B | 66 | 4.45 | 0.134 | 1.043 | | | |
| C | 72 | 4.25 | 0.134 | 0.952 | | | |
| D | 126 | 4.05 | 0.134 | 0.864 | | | |
| E | 12 | 3.95 | 0.133 | 0.816 | | | |
| F | 3 | 2.80 | 0.132 | 0.408 | | | |
| G | 12 | 2.65 | 0.132 | 0.365 | | | |

Figure 4:
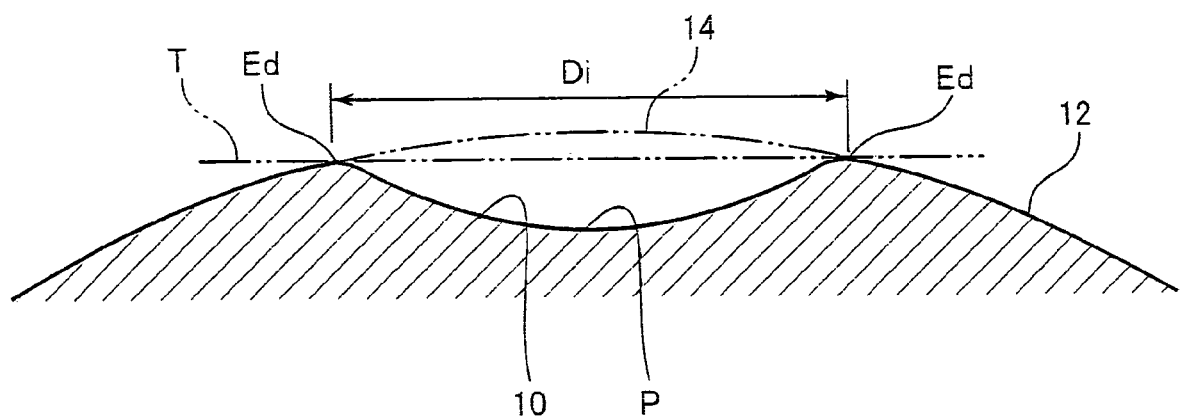
FIG. 4 is an enlarged view illustrating a dimple formed on a surface of a golf ball.

Notes on Table 4
With regard to the dimple in Table 4, "diameter" refers to Di in FIG. 4, and "depth" refers to the distance between tangent T and the deepest point P, while "volume" means the volume of the part surrounded by the plane containing the contour of dimple 10 and phantom sphere 14.

TABLE 5

| | Golf ball No. | | | | | | | | | | | | | | |
|---|---|---|---|---|---|---|---|---|---|---|---|---|---|---|---|
| | No. 1 | No. 2 | No. 3 | No. 4 | No. 5 | No. 6 | No. 7 | No. 8 | No. 9 | No. 10 | No. 11 | No. 12 | No. 13 | No. 14 | No. 15 |
| Type of core | A | A | A | B | A | A | A | A | A | A | A | A | A | A | A |
| Intermediate layer composition | — | — | — | A | — | — | — | — | — | — | — | — | — | — | — |
| Thickness of inermediate layer (mm) | — | — | — | 1.5 | — | — | — | — | — | — | — | — | — | — | — |

TABLE 5-continued

| | Golf ball No. | | | | | | | | | | | | | | |
|---|---|---|---|---|---|---|---|---|---|---|---|---|---|---|---|
| | No. 1 | No. 2 | No. 3 | No. 4 | No. 5 | No. 6 | No. 7 | No. 8 | No. 9 | No. 10 | No. 11 | No. 12 | No. 13 | No. 14 | No. 15 |
| Hardness of intermediate layer (Shore D hardness) | — | — | — | 66 | — | — | — | — | — | — | — | — | — | — | — |
| Cover composition | A | B | C | C | D | E | F | G | H | I | J | K | L | M | N |
| Thickness of cover (mm) | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Compression deformation amount of golf ball (mm) | 2.60 | 2.75 | 2.90 | 2.70 | 2.65 | 2.80 | 2.74 | 2.76 | 2.68 | 2.81 | 2.94 | 2.83 | 2.61 | 2.69 | 2.78 |
| Resilience index | 105 | 100 | 98 | 101 | 103 | 99 | 100 | 100 | 101 | 98 | 95 | 97 | 104 | 101 | 100 |
| Abrasion-resistance | G | G | G | G | G | G | G | G | F | F | P | P | G | G | G |
| Shot feeling | G | G | G | G | G | G | G | G | G | F | F | F | G | G | G |

In Table 5, golf balls No. 1 to No. 8 and No. 13 to No. 15 are golf balls using for the telechelic ionomer composition comprising the binary copolymer obtained by copolymerizing an olefin monomer having 2 to 8 carbon atoms and an unsaturated monomer having an acid functional group and/or the ternary copolymer obtained by copolymerizing the olefin monomer having 2 to 8 carbon atoms, the unsaturated monomer having an acid functional group and the unsaturated carboxylic acid ester, wherein functional groups are introduced in both terminals of the copolymers (In case of the golf ball No. 4, the telechelic ionomer composition is also used for the intermediate layer).

All of the golf balls were excellent in balance of the resilience, the abrasion-resistance and the shot feeling. Golf balls No. 9 to No. 12 are the case that mixtures of the conventional ionomer resins were used. All of them had poor abrasion-resistance, and the resilience tends to be low.

The present invention can provide a golf ball having well-balanced flight distance (resilience), abrasion-resistance and shot feeling.

This application is based on Japanese Patent application No. 2006-002922 filed on Jan. 10, 2006, the contents of which are hereby incorporated by reference.

What is claimed is:

1. A telechelic ionomer composition for a golf ball comprising,
a binary copolymer obtained by copolymerizing an olefin monomer having 2 to 8 carbon atoms and an unsaturated monomer having an acid functional group, and/or
a ternary copolymer obtained by copolymerizing an olefin monomer having 2 to 8 carbon atoms, an unsaturated monomer having an acid functional group and an unsaturated carboxylic acid ester,
wherein the olefin monomer comprises at least one member selected from the group consisting of ethylene, propylene, butylene, pentene, hexene, heptene and octane; and functional groups are introduced in both terminals of the binary copolymer and/or the ternary copolymer.

2. The telechelic ionomer composition for the golf ball according to claim 1, wherein the terminal functional group is at least one member selected from the group consisting of a carboxylic group, a hydroxyl group, an amino group, an isocyanate group, halogen, a nitro group, a thiol group and an epoxy group.

3. The telechelic ionomer composition for the golf ball according to claim 1, wherein the telechelic ionomer contains the unsaturated monomer having the acid functional group in an amount of 1 mass % to 50 mass %.

4. The telechelic ionomer composition for the golf ball according to claim 1, wherein at least 10 mole % or more of the acid functional group in the telechelic ionomer is neutralized.

5. The telechelic ionomer composition for the golf ball according to claim 1, wherein the telechelic ionomer is neutralized with at least one metal selected from the group consisting of the 1st group to the 17th group of the periodic table, lanthanoids and actinoids.

6. The telechelic ionomer composition for the golf ball according to claim 1, wherein isocyanate groups are introduced into both terminals of the binary copolymer and/or the ternary copolymer.

7. The telechelic ionomer composition for the golf ball according to claim 1, wherein amino groups are introduced into both terminals of the binary copolymer and/or the ternary copolymer.

8. The telechelic ionomer composition for the golf ball according to claim 1, wherein functional groups are introduced into both terminal of the binary copolymer, the telechelic ionomer contains the unsaturated monomer having the acid functional group in an amount of 1 mass % to 50 mass %, and at least 10 mole % or more of the acid functional group in the telechelic ionomer is neutralized.

9. The telechelic ionomer composition for the golf ball according to claim 1, wherein the carboxylic groups or the isocyanate groups are introduced into both terminals of the binary copolymer comprising ethylene and methacrylic acid.

10. The telechelic ionomer composition for the golf ball according to claim 2, wherein functional groups are introduced into both terminals of the ternary copolymer, the telechelic ionomer contains the unsaturated monomer having the acid functional group in an amount of 1 mass % to 50 mass %, and at least 10 mole % or more of the acid functional group in the telechelic ionomer is neutralized.

11. The telechelic ionomer composition for the golf ball according to claim 1, wherein isocyanate groups are introduced into both terminals of the ternary copolymer comprising ethylene, methacrylic acid, and acrylate.

12. A two-piece golf ball comprising,
a core, and
a cover covering said core,
wherein the cover has a resin component which comprises the telechelic ionomer composition according to claim 1.

13. The two-piece golf ball according to claim 12, wherein the terminal functional group is at least one member selected from the group consisting of a carboxylic group, a hydroxyl group, an amino group, an isocyanate group, halogen, a nitro group, a thiol group and an epoxy group, the telechelic ionomer contains the unsaturated monomer having the acid functional group in an amount of 1 mass % to 50 mass %, and at least 10 mole % or more of the acid functional group in the telechelic ionomer is neutralized.

14. A three-piece golf ball comprising,
a core,
an intermediate layer covering said core, and
a cover covering said intermediate layer,
wherein at least one of the intermediate layer and the cover has a resin component which comprises the telechelic ionomer composition according to claim 1.

15. The three-piece golf ball according to claim 14, wherein the terminal functional group is at least one member selected from the group consisting of a carboxylic group, a hydroxyl group, an amino group, an isocyanate group, halogen, a nitro group, a thiol group and an epoxy group, the telechelic ionomer contains the unsaturated monomer having the acid functional group in an amount of 1 mass % to 50 mass %, and at least 10 mole % or more of the acid functional group in the telechelic ionomer is neutralized.

16. A multi-piece golf ball having at least four layers including a core layer, wherein at least one layer thereof, except the core layer, has a resin component which comprises the telechelic ionomer composition according to claim 1.

17. The multi-piece golf ball according to claim 16, wherein the terminal functional group is at least one member selected from the group consisting of a carboxylic group, a hydroxyl group, an amino group, an isocyanate group, halogen, a nitro group, a thiol group and an epoxy group, the telechelic ionomer contains the unsaturated monomer having the acid functional group in an amount of 1 mass % to 50 mass %, and at least 10 mole % or more of the acid functional group in the telechelic ionomer is neutralized.

18. The telechelic ionomer composition for the golf ball according to claim 8, wherein the telechelic ionomer is neutralized with at least one metal selected from the group consisting of the 1st group to the 17th group of the periodic table, lanthanoids and actinoids.

19. The telechelic ionomer composition for the golf ball according to claim 10, wherein the telechelic ionomer is neutralized with at least one metal selected from the group consisting of the 1st group to the 17th group of the periodic table, lanthanoids and actinoids.

20. The telechelic ionomer composition for the golf ball according to claim 19, wherein isocyanate groups are introduced into both terminals of the ternary copolymer comprising ethylene, methacrylic acid, and acrylate.

\* \* \* \* \*